No. 897,437. PATENTED SEPT. 1, 1908.
W. H. WATSON.
CALIPERS.
APPLICATION FILED SEPT. 19, 1907.
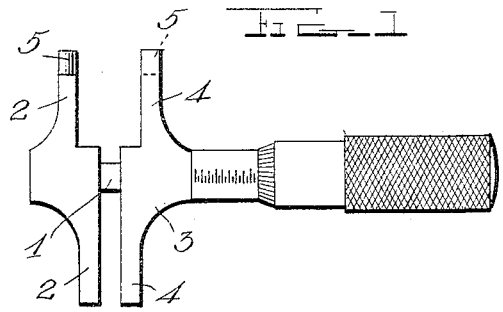
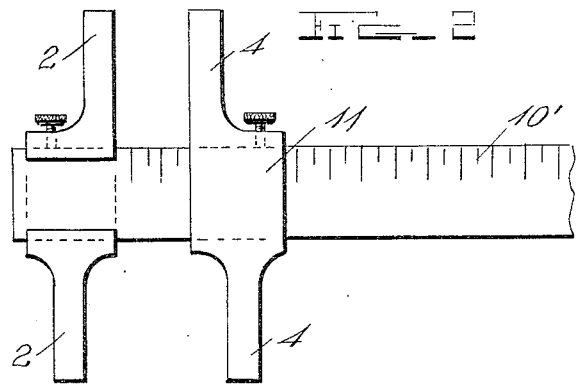
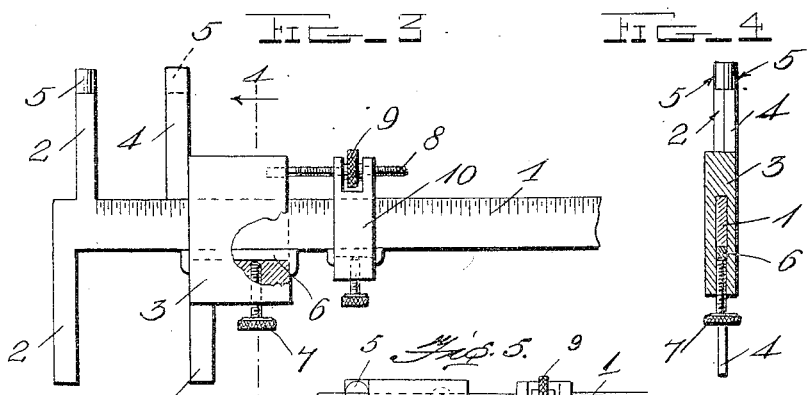
Witnesses
C. H. Griesbauer
Inventor
W. H. Watson
by H. B. Willson & Co.
Attorneys

UNITED STATES PATENT OFFICE.

WILLIAM H. WATSON, OF LAKEPORT, NEW HAMPSHIRE.

CALIPERS.

No. 897,437.  Specification of Letters Patent.  Patented Sept. 1, 1908.

Application filed September 19, 1907. Serial No. 393,672.

*To all whom it may concern:*

Be it known that I, WILLIAM H. WATSON, a citizen of the United States, residing at Lakeport, in the county of Belknap and State of New Hampshire, have invented certain new and useful Improvements in Calipers; and I do declare the following to be a full, clear, and exact description of the invention, such as will enable others skilled in the art to which it appertains to make and use the same.

This invention has relation to new and useful improvements in calipers, and has for its object to provide a simple and economical device of this kind, through the use of which both inside and outside measurements may be quickly and accurately made.

My improvements may be used in connection with either micrometers, calipers, or caliper squares.

With the foregoing and other objects in view, that will readily appear as the nature of the invention is better understood, the invention resides in the novel features of construction, combination and arrangement of parts, as will be more fully described and particularly pointed out in the appended claim.

In the accompanying drawings: Figure 1 is a view in side elevation of a pair of micrometer calipers provided with my improvements. Fig. 2 is a side elevation of the invention used in connection with an ordinary ruler. Fig. 3 is a view in side elevation of a caliper square provided with my improvements; and Fig. 4 is a cross sectional view taken on the plane indicated by the dotted lines 4—4 of Fig. 3, looking in the direction indicated by the arrows. Fig. 5 is a plan view of Fig. 3 with the reduced rounded portions of the slide and body arms in registration.

In the accompanying drawings, which are for illustrative purposes only and, therefore, not drawn to any particular scale, 1, indicates the body of an ordinary caliper square, said body having the usual scale or graduation on one face.

In carrying out the invention, the body is provided with two laterally extending arms, 2, which extend from opposite side edges at one end, and are so arranged relatively to each other that the inner side edge of one of the arms alines with the outer side edge of the other arm. A slide, 3, of preferably rectangular form is slidably mounted on the body and is provided at opposite end edges with outwardly extending arms, 4, which are also so arranged relatively to each other that the inner edge of one alines with the outer edge of the other.

The arms of the body and the slide lying on the same side of the caliper square are of preferably square or rectangular form in cross-section and are used for taking outside measurements, and the arms lying on the opposite side of the instrument are also preferably of square or rectangular form except near their outer ends and sides, as at 5, at which points they are correspondingly rounded in approximately semi-circular form so that inside measurements of objects having rounded surfaces may be made with a greater degree of accuracy than would be possible were this construction not employed.

A clamping plate, 6, is arranged in the sliding member and is adapted to be clamped against one side edge of the caliper body, by a clamping screw, 7, working through one end of the sliding member.

A longitudinal screw, 8, extends from one side edge of the sliding member, and works through a nut 9 carried by a clamping member, 10, slidably mounted on the body of the calipers. By this arrangement, as will be readily perceived, the sliding member may be adjusted along the body in taking a measurement.

In Fig. 1, I have shown my improvements, applied to a pair of micrometer calipers.

In Fig. 2, I have used an ordinary rule, 10', as the body of the calipers. In this case the arms at one end of the ruler, which correspond with the arms of the caliper body, 1, are in the nature of extensions of a clamping member, 11, arranged to slide on the rule.

By providing a pair of calipers with the improvements illustrated and defined, it will be readily perceived that both inside and outside measurements may be readily and accurately made with the employment of but one instrument.

From the foregoing description, taken in connection with the drawings, it is thought that the construction and operation of the invention will be understood, without requiring a more extended explanation.

Having thus described the nature of my invention, what I claim as new and desire to secure by Letters-Patent, is:

A device of the character specified, comprising a graduated body formed at its outer end and at one side with a laterally extending arm one side of which is flat its entire length and the opposite side of which is formed at the outer end of the arm with a rounded portion of approximately semi-circular form, and a slide mounted to slide on the body, said slide being cast with a laterally extending arm adapted for movement in a plane parallel with the body arm one side of the slide arm being flat and adapted to slide against the flat side of the body arm and the opposite side thereof formed with a rounded portion to correspond and register with the rounded portion of the body arm, with means for adjusting the slide.

In testimony whereof I have hereunto set my hand in presence of two subscribing witnesses.

WILLIAM H. WATSON.

Witnesses:
J. G. QUIMBY,
W. L. WOODWORTH.

Bystrom - 542,676 - 95  gages Microm
McIntyre 571,094 - 96     "      "
Le Compte 869,578 - 07    " dimension
Stupakoff 438,504 - 90    " Microm
Bellows 427,956 - 90      "      "